(12) United States Patent
Delk et al.

(10) Patent No.: US 10,417,371 B2
(45) Date of Patent: Sep. 17, 2019

(54) POWER GRID HEALING TECHNIQUES

(71) Applicant: ARM Limited, Cambridge (GB)

(72) Inventors: Karen Lee Delk, Austin, TX (US);
Marlin Wayne Frederick, Jr., Austin, TX (US); Ravindra Narayana Rao, Austin, TX (US)

(73) Assignee: ARM Limited, Cambridge (GB)

( * ) Notice: Subject to any disclaimer, the term of this patent is extended or adjusted under 35 U.S.C. 154(b) by 66 days.

(21) Appl. No.: 15/418,602

(22) Filed: Jan. 27, 2017

(65) Prior Publication Data

US 2018/0218107 A1 Aug. 2, 2018

(51) Int. Cl.
*G06F 17/50* (2006.01)

(52) U.S. Cl.
CPC ...... *G06F 17/5077* (2013.01); *G06F 17/5081* (2013.01); *G06F 2217/78* (2013.01)

(58) Field of Classification Search
USPC .................... 716/111, 118, 119, 126, 127
See application file for complete search history.

(56) References Cited

U.S. PATENT DOCUMENTS

| | | | |
|---|---|---|---|
| 2002/0065643 A1 | 5/2002 | Hirano et al. | |
| 2003/0066041 A1* | 4/2003 | Saxena | G06F 17/5077 716/127 |
| 2006/0080630 A1* | 4/2006 | Lin | G06F 17/5077 716/115 |
| 2008/0120586 A1* | 5/2008 | Hoerold | G06F 17/5068 716/52 |
| 2011/0102076 A1* | 5/2011 | Ogata | H01L 27/0207 327/565 |
| 2014/0103959 A1* | 4/2014 | Andreev | H03K 19/018585 326/41 |
| 2014/0103985 A1* | 4/2014 | Andreev | H03K 5/131 327/262 |

OTHER PUBLICATIONS

Delk; U.S. Appl. No. 15/418,593, filed Jan. 27, 2017.

* cited by examiner

*Primary Examiner* — Brian Ngo
(74) *Attorney, Agent, or Firm* — Pramudji Law Group PLLC; Ari Pramudji

(57) ABSTRACT

Various implementations described herein are directed to an apparatus. The apparatus may include a region identifier module that receives a floorplan of an integrated circuit, identifies a standard cell region between already placed functional blocks of the floorplan, and sub-divides the standard cell region into multiple sub-regions. The apparatus may include a region analyzer module that analyzes each sub-region of the multiple sub-regions to determine a number of already placed power straps that exist within a boundary of each sub-region. The apparatus may include a strap placement module that inserts one or more additional power straps in each sub-region based on user defined parameters for each sub-region, if it is determined that the number of already placed power straps is inconsistent with the user defined parameters for each sub-region.

20 Claims, 18 Drawing Sheets

POWER GRID HEALING TECHNIQUES

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Integrated circuits typically include wires (or other conductors) that are formed to transfer power and other electrical signals. Each wire may have a wire pitch that refers to a sum of a width and space of the wire. Standard cell (SC) placement and routing tools typically involve routing wires on predetermined pitches and at predetermined positions within various layers on integrated circuits. Power wires are typically placed in a repeating pattern across the design. In some cases, pre-placed obstructions in a floorplan of an integrated circuit design can leave areas of standard cell (SC) placement with no or inadequate power as these obstructions can block all access up to its top metal layer. The rectilinear nature of many floorplans can also interfere with the repeating pattern. Two traditional approaches to resolving this issue are inserting more power nets than required to meet IR drop requirements or restricting how the obstructions are placed to insure the standard cell (SC) placement areas between them receive an adequate amount of supply. The first approach blocks more resources for signal routing than necessary. The second approach can waste area or lead the an inefficient floorplan by moving the obstructions from their ideal positions. Both can negatively affect the power, performance, and area goals for the integrated circuit design. Therefore, there exists a need to improve integrated circuit designs to adequately supply power to more areas of a floorplan.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein refer to and are directed to providing power grid healing schemes and techniques in accordance with various implementations described herein. The power grid healing schemes and techniques provide for addressing power grid supply integrity and electromigration around floorplan obstructions. By default power grids may be inserted into physical design floorplans (of CPUS, GPUs, etc.) using a repeating pattern. The power grid healing schemes and techniques provide for finding locations in a physical design floorplan that may be missing power or have an inadequate power supply due to various floorplan obstructions. Once found, the power grid healing schemes and techniques provide for repairing or healing these obstructed locations.

Various implementations of providing various power grid healing schemes and techniques will now be described in detail herein with reference to FIGS. 1-5.

Figure 1:
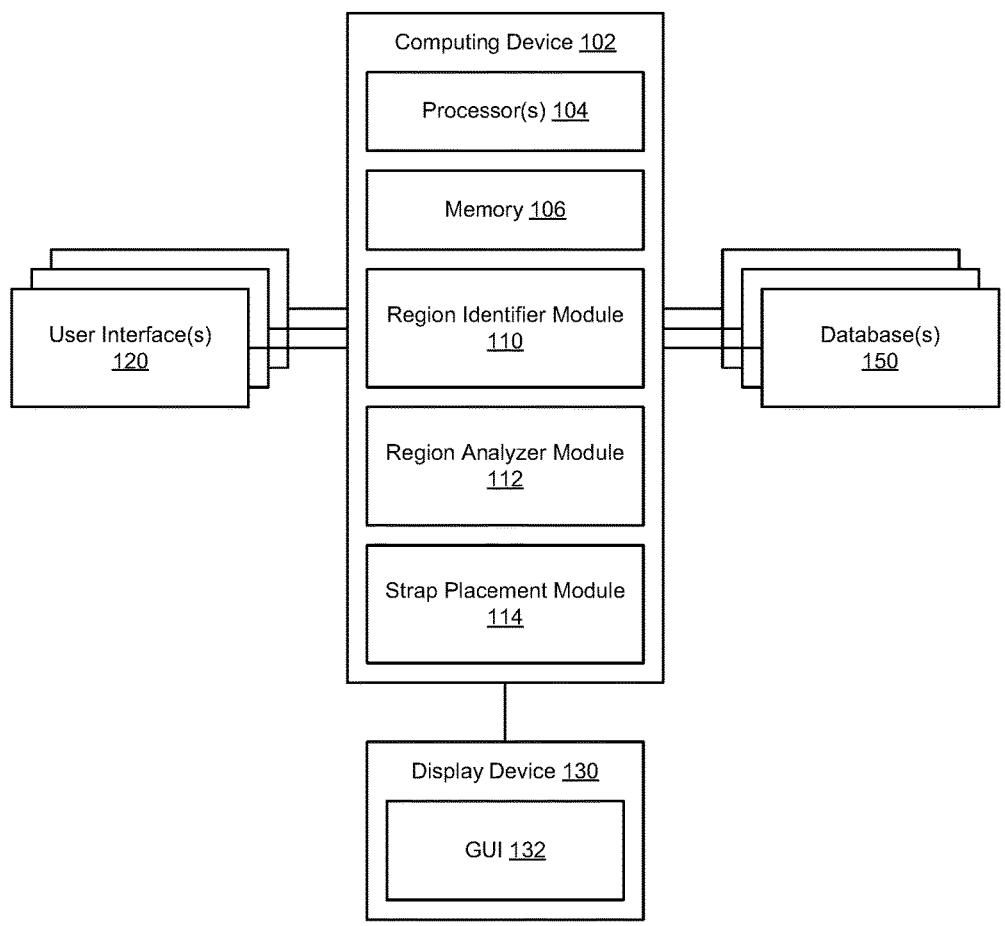
FIG. 1 illustrates a block diagram of a system for implementing a power grid healing technique in accordance with various implementations described herein.

FIG. 1 is a block diagram illustrating one embodiment of an apparatus 100 that utilizes a computing device 102 for implementing power grid healing schemes and techniques with various methods associated therewith.

In reference to FIG. 1, the apparatus 100 may be implemented as a system having the computing device 102 purposed for power grid healing, thereby transforming the computing device 102 into a special purpose machine dedicated to implementation of power grid healing schemes and techniques, as described herein. Thus, the computing device 102 may include standard element(s) and/or component(s), including at least one processor(s) 104, memory 106 (e.g., non-transitory computer-readable storage medium), peripherals, power, and various other computing elements and/or components that are not specifically shown in FIG. 1. Further, as shown in FIG. 1, the apparatus 100 may be associated with a display device 130 (e.g., a monitor or other display) that may be used to provide a graphical user interface (GUI) 132. In some instances, the GUI 132 may be used to receive input from a user (e.g., user input) associated with power grid healing schemes and techniques. In other instances, one or more other user interfaces (UI) 120 (e.g., one or more other computing devices having GUIs or similar) may be used to receive input from one or more other users (e.g., other user input) associated with power grid healing schemes and techniques. The apparatus 100 may also be associated with one or more databases 150 configured to store and/or record data and information related to the users and power grid healing schemes and techniques.

Accordingly, the apparatus 100 may thus include the computing device 102 and instructions stored or recorded on the computer-readable medium 106 (or the one or more databases 150) and executable by the at least one processor 104. The apparatus 100 may be utilized for implementing power grid healing schemes and techniques. Further, the apparatus 100 may include the display device 130 for providing output to a user, and the display device 130 may include the GUI 132 for receiving input from the user. In some cases, the one or more UIs 120 may be used for providing output to one or more other users and receiving input from the one or more other users.

Figure 2A:
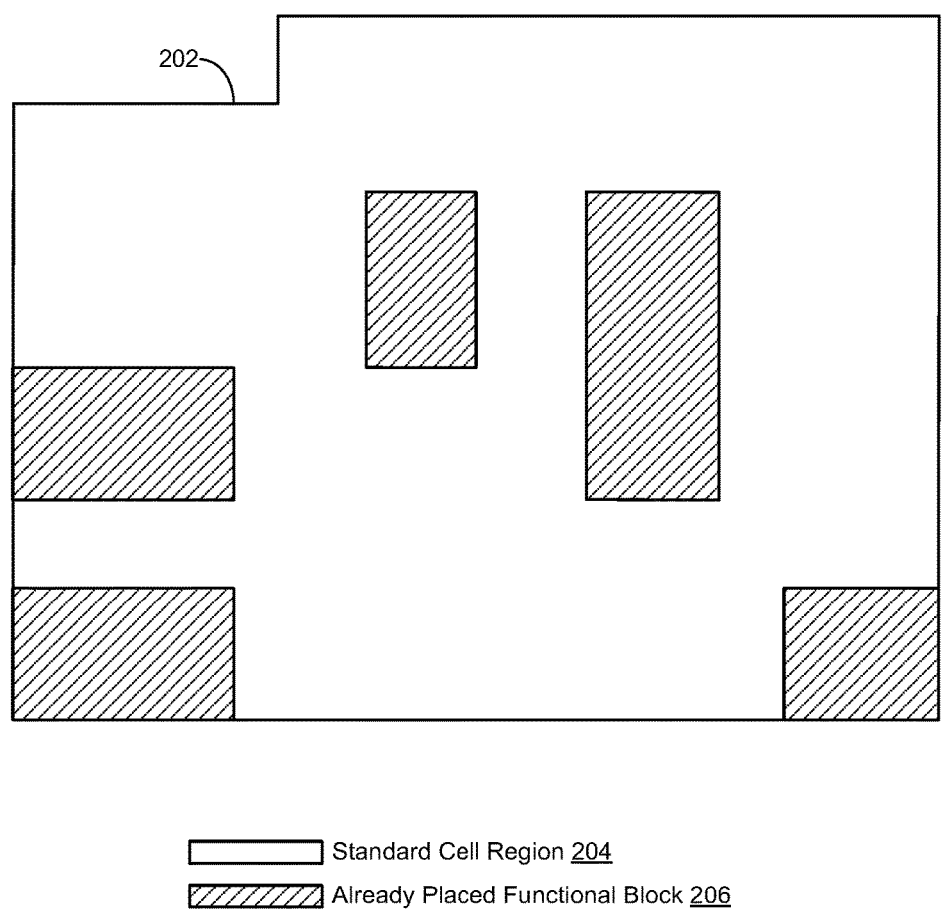
FIGS. 2A-2N illustrate diagrams of modifying power grid layout architecture in accordance with various implementations described herein.

The computing device 102 may include one or more modules, such as, e.g., a region identifier module 110. In some scenarios, the region identifier module 110 may receive a floorplan 202 of an integrated circuit (e.g., as shown in FIG. 2A), identify a standard cell region 204 between already placed functional blocks 206 of the floorplan 202, and sub-divide the standard cell region 204 into multiple sub-regions 212 (e.g., as shown in FIG. 2D). In some scenarios, each sub-region of the multiple sub-regions 212 may be numerically ordered from smallest in width to largest in width (e.g., sub-region order 212:1-8, as shown in FIGS. 2D-2E). In some instances, each sub-region of the multiple sub-regions 212 may have some sort of geometrical shape. In various instances, the geometrical shape may be rectangular. In various other instances, the geometrical shape may be a horizontally oriented rectangle or a vertically oriented rectangle.

The region identifier module 110 may receive the user defined parameters from a user via user input. The user defined parameters may identify architectural features or structures having different power domains or multiple power domains or islands for fabrication with power straps and attachment to a power grid.

As shown in FIG. 2A, the floorplan 202 may include already placed functional blocks 206 that may represent various circuit components or devices of the integrated circuit. The floorplan 202 of the integrated circuit may be embodied as a schematic representation of physical placement of the already placed functional blocks 206 within an outer peripheral boundary of the integrated circuit. Further, the already placed functional blocks 206 may define various macros representing the components of the integrated circuit including, e.g., one or more of a core, a memory, a double data rate (DDR) unit, a power management unit, and various other types of devices and/or components that may be useful in providing various features and functionality that may be associated with the integrated circuit. The floorplan of the integrated circuit may be utilized for applying the integrated circuit to a semiconductor wafer.

The computing device 102 may include a region analyzer module 112. In some scenarios, the region analyzer module 112 may analyze each sub-region of the multiple sub-regions 212 to determine a number of already placed power straps 210 (e.g., inserted constraint straps 210, as shown in FIG. 2D) that exist within a boundary of each sub-region 212 or within a boundary of the floorplan 202. The already placed power straps 210 may comprise at least one of metal wires, power switches, power gates, and vias. In some scenarios, the region analyzer module 112 may analyze each sub-region 212 in numerical order 214 of the sub-regions 212 from smallest in width (e.g., sub-region 212:1) to largest in width (e.g., sub-region 212:8).

The computing device 102 may include a strap placement module 114. In some scenarios, the strap placement module 114 may insert one or more additional power straps 216 (e.g., inserted healing straps 216, as shown in FIGS. 2F-2M) in each sub-region 212 based on user defined parameters for each sub-region 212, if it is determined that the number of already placed power straps 210 (e.g., inserted constraint straps 210) is inconsistent with the user defined parameters for each sub-region 212. In some cases, the strap placement module 114 may inhibit insertion of the one or more additional power straps 216 in each sub-region 212, if determined that the number of already placed power straps 216 is consistent with the user defined parameters for each sub-region 212.

The already placed power straps 210 and additional straps may include at least one of metal wires, power switches, power gates, and vias. The metal wire on any particular layer may include two or more parallel wires on that same layer. The strap placement module 114 may insert the one or more additional power straps 216 in each sub-region 212 by way of or in the numerical order 214 of the sub-regions 212 from smallest in width (e.g., sub-region 212:1) to largest in width (e.g., sub-region 212:8). The strap placement module 114 may insert the one or more additional power straps 216 in each sub-region 212 based on the user defined parameters for each sub-region 212, e.g., by adding the one or more additional power straps 216 in each sub-region 212 such that the one or more additional power straps 216 align with at least one previously inserted additional power strap 216 in an adjacent sub-region or neighboring sub-region (e.g., as shown in FIGS. 2I, 2K, 2L, and 2M); a central portion of each sub-region 212 (e.g., as shown FIG. 2F); or an edge portion of each sub-region 212 (e.g., as shown in FIGS. 2G, 2H, 2J); or combinations thereof. In some cases, if more than one power strap is to be inserted or added in a sub-region, then multiple additional power straps may be inserted or added to the sub-region so as to be as evenly spaced in the sub-region as possible while avoiding constraint straps.

In reference to FIG. 1, the apparatus 100 is shown using various functional blocks or modules that represent discrete functionality. However, it should be understood that such illustration is provided for clarity and convenience, and therefore, it should be appreciated that the various functionalities may overlap or be combined within a described block(s) or module(s), and/or may be implemented by one or more additional block(s) or module(s) that are not specifically illustrated in FIG. 1. Further, it should be understood that various standard and/or conventional functionality that may be useful to the apparatus 100 of FIG. 1 may be included as well even though such standard and/or conventional elements are not illustrated explicitly, for the sake of clarity and convenience.

As described herein, the power grid healing schemes and techniques provide for identifying obstructed locations in physical design floorplans that may be repaired or healed. The power grid for each power domain may be modified based on user defined parameters and/or constraints for a specific floorplan. Accordingly, the power grid healing schemes and techniques may provide for alignment of structures across multiple different power domains and healing of areas of the power domain that have violations due to one or more issues related to a non-minimum power switch cell count, a non-minimum power switch cell coverage, a non-minimum strap count, and a non-minimum strap coverage.

Accordingly, the power grid healing schemes and techniques may provide for alignment of structures across multiple different power domains and healing of areas of the power domain that have violations due to one or more issues related to a non-minimum power strap count or inadequate strap coverage. Inadequate strap coverage can occur when the left-most power strap for a particular supply is too far from the left edge of a region as defined by user input leading to electromigration and/or voltage drop issues. The same is true for right-most, top-most, or bottom-most depending on the power straps orientation.

Figure 2B:
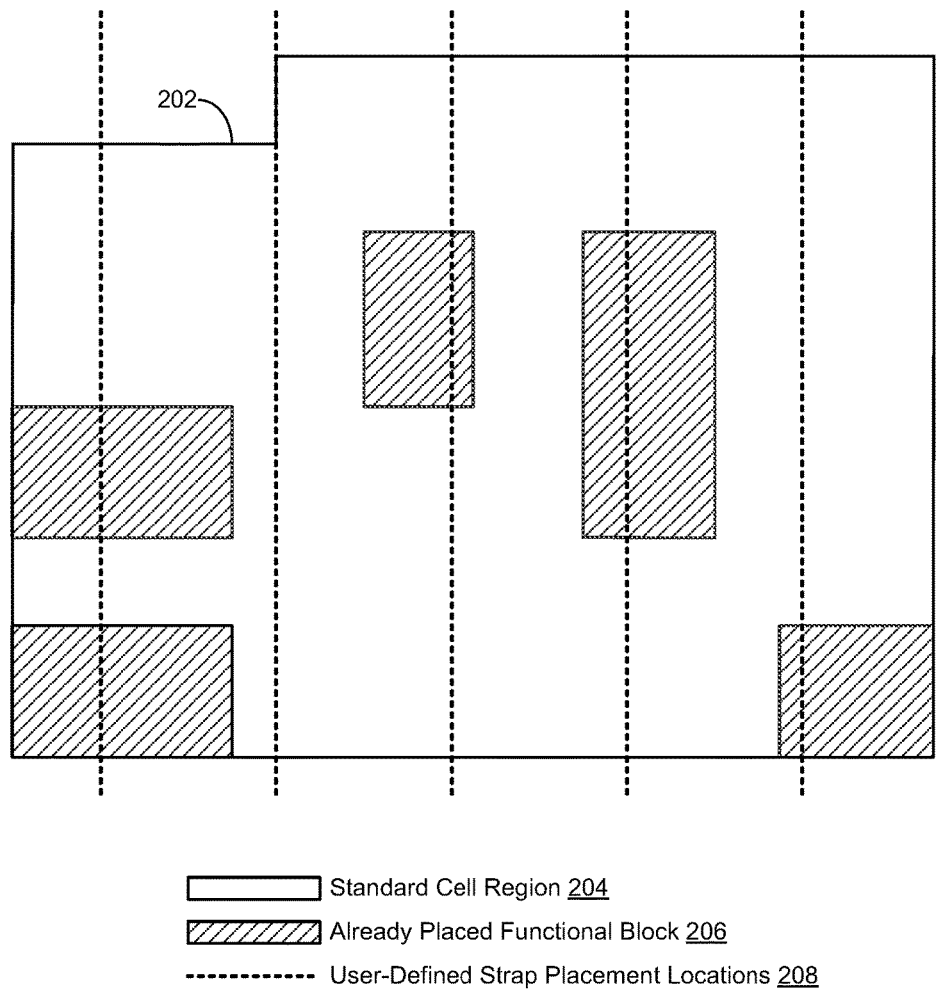
Figure 2C:
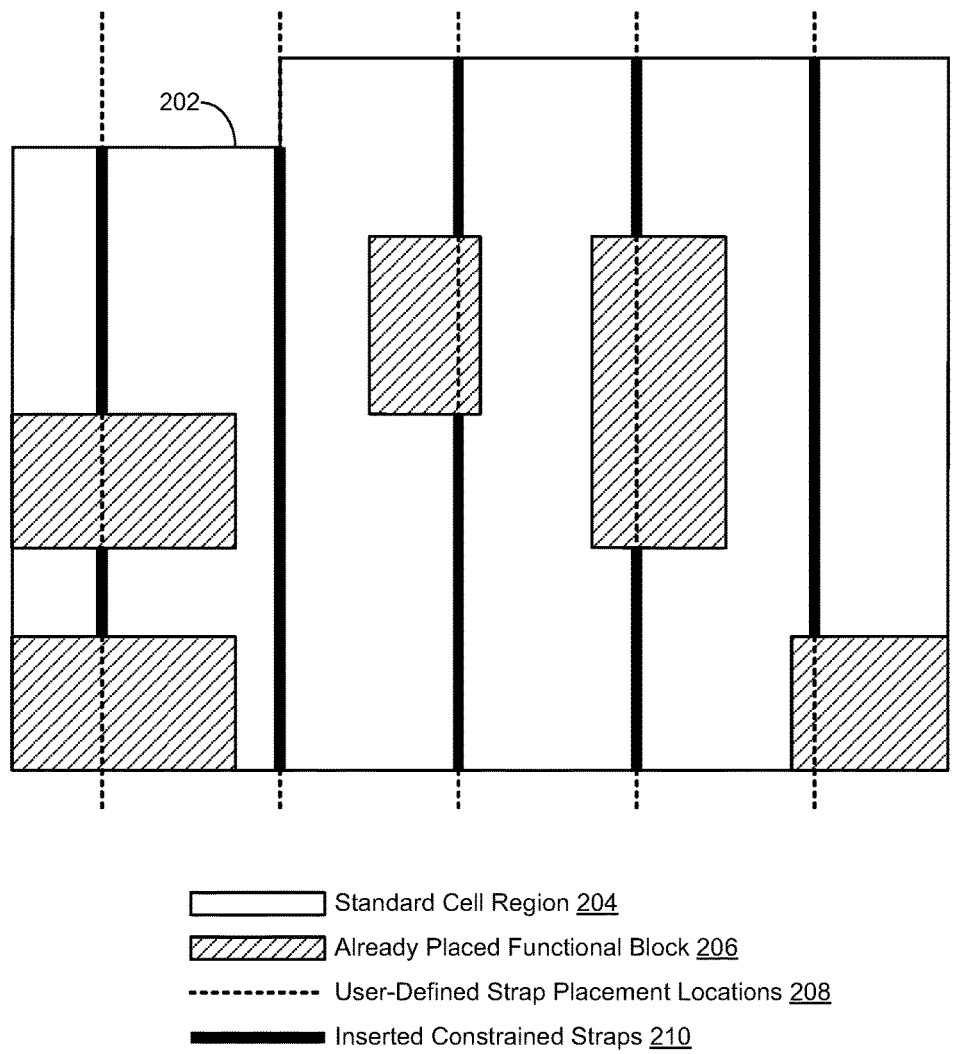
Figure 2D:
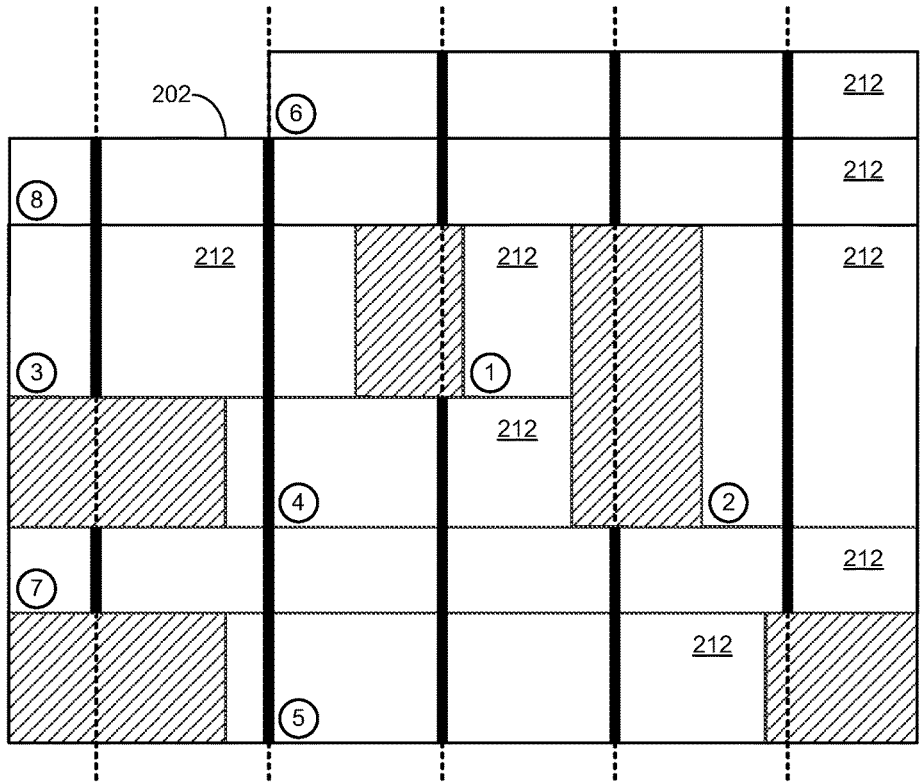
Figure 2E:
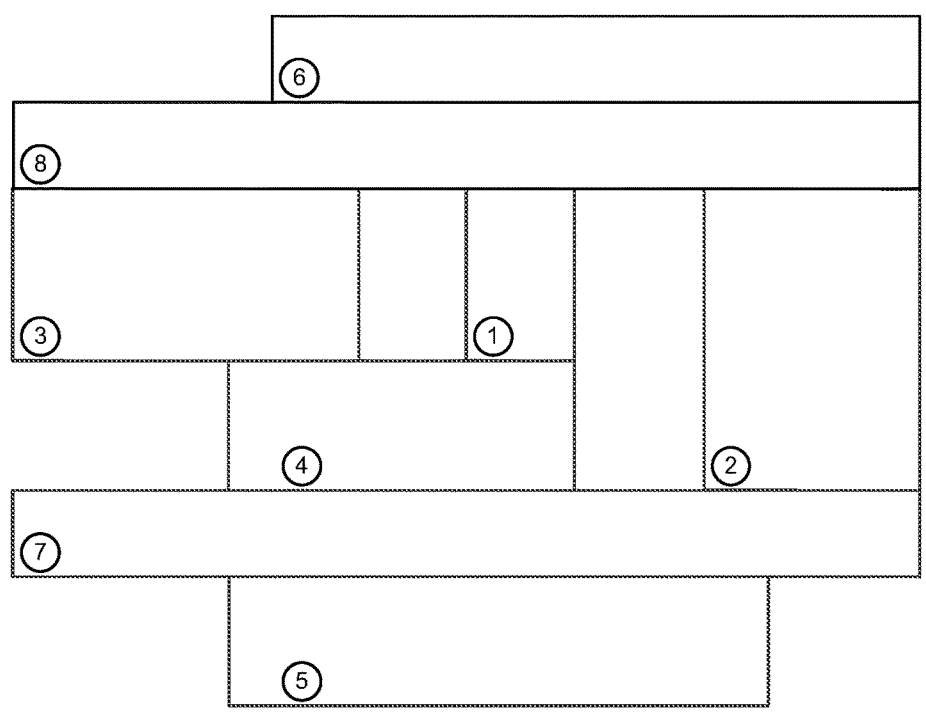
Figure 2F:
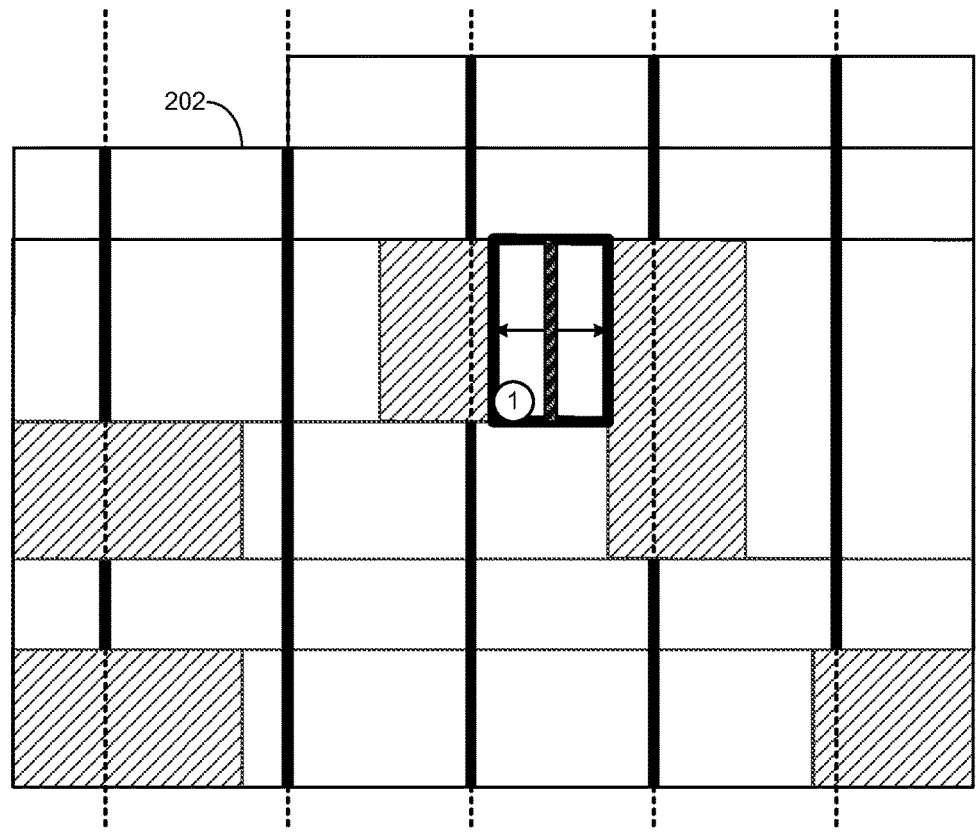
Figure 2G:
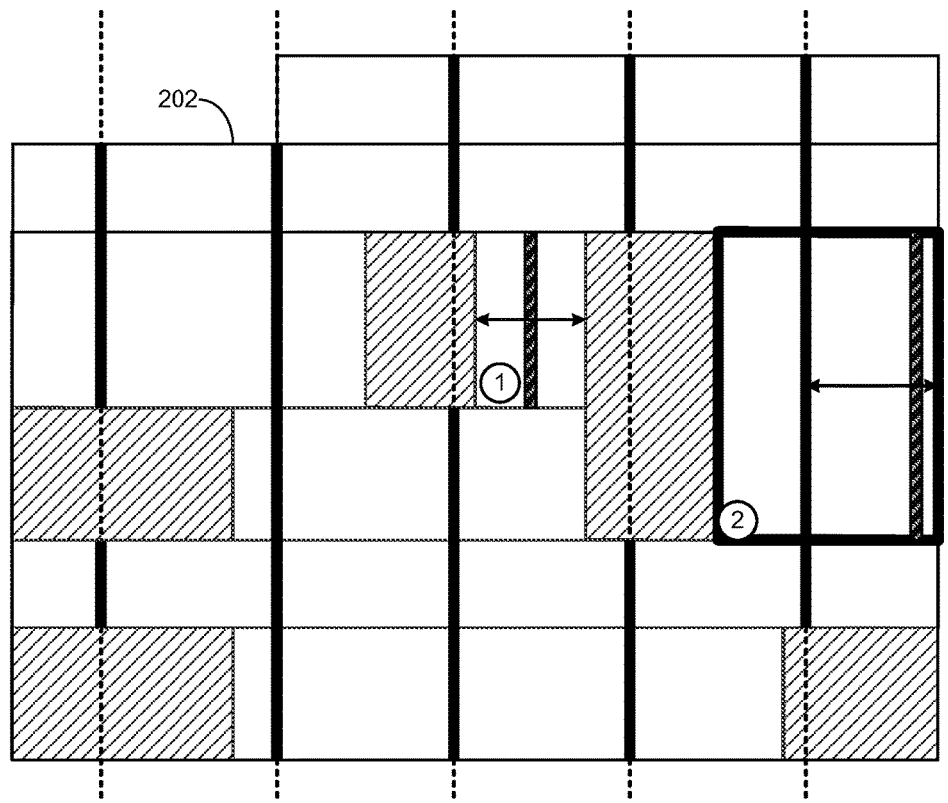
Figure 2H:
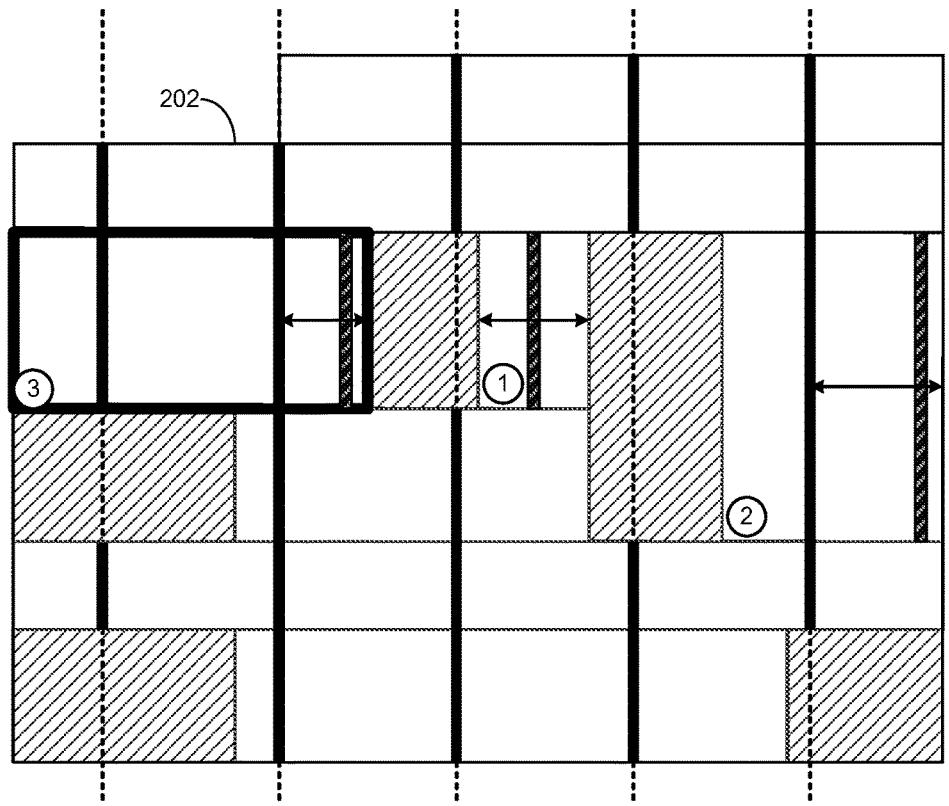
Figure 2I:
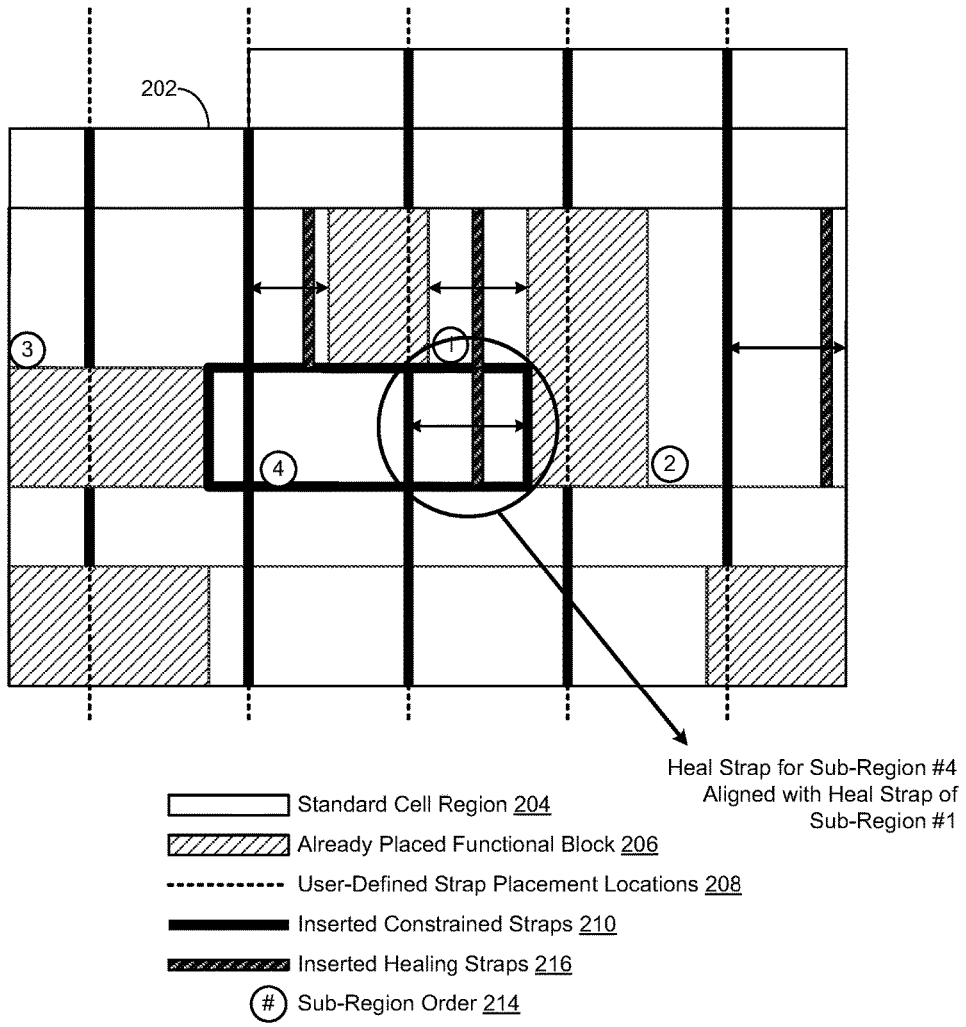
Figure 2J:
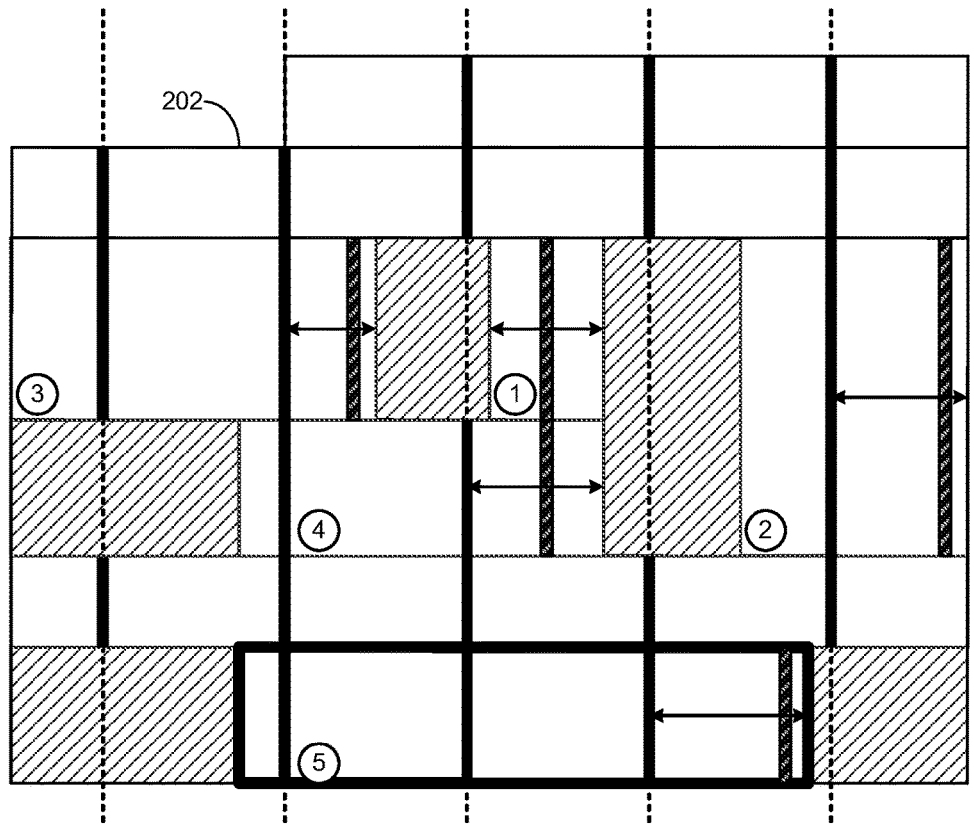
Figure 2K:
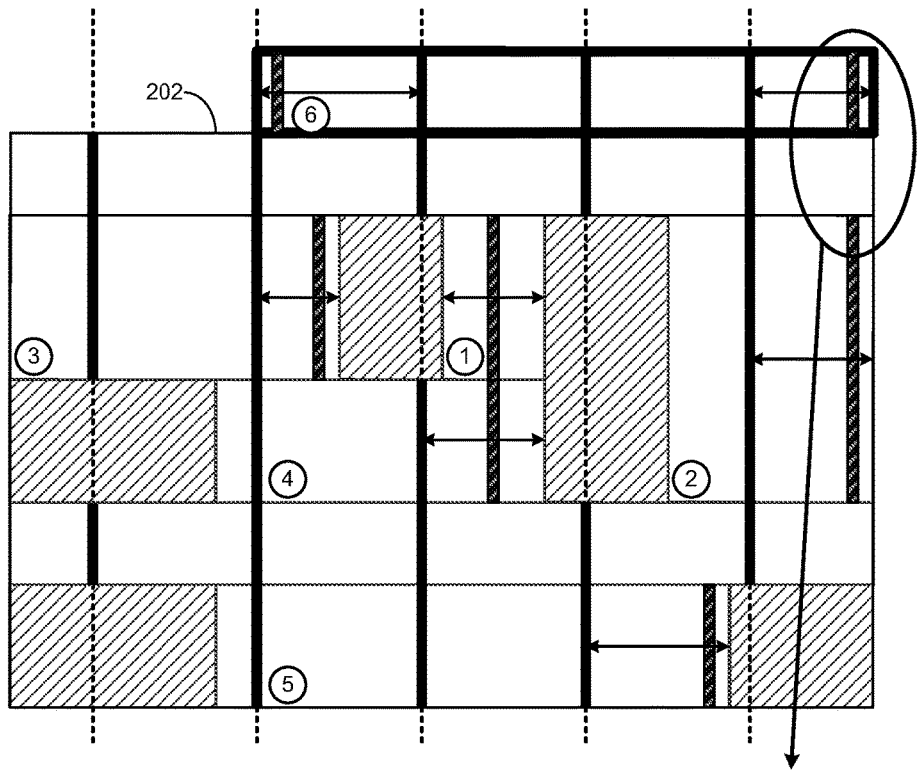
Figure 2L:
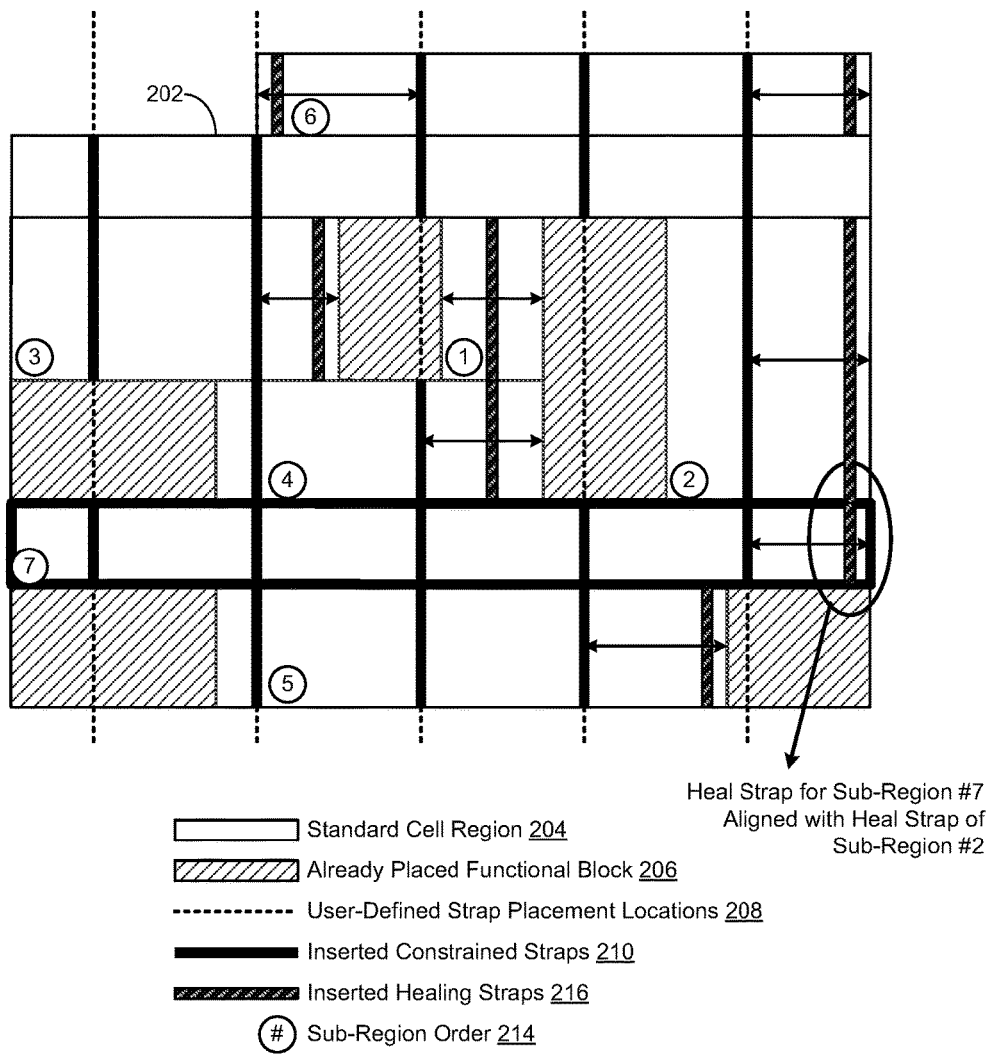
Figure 2M:
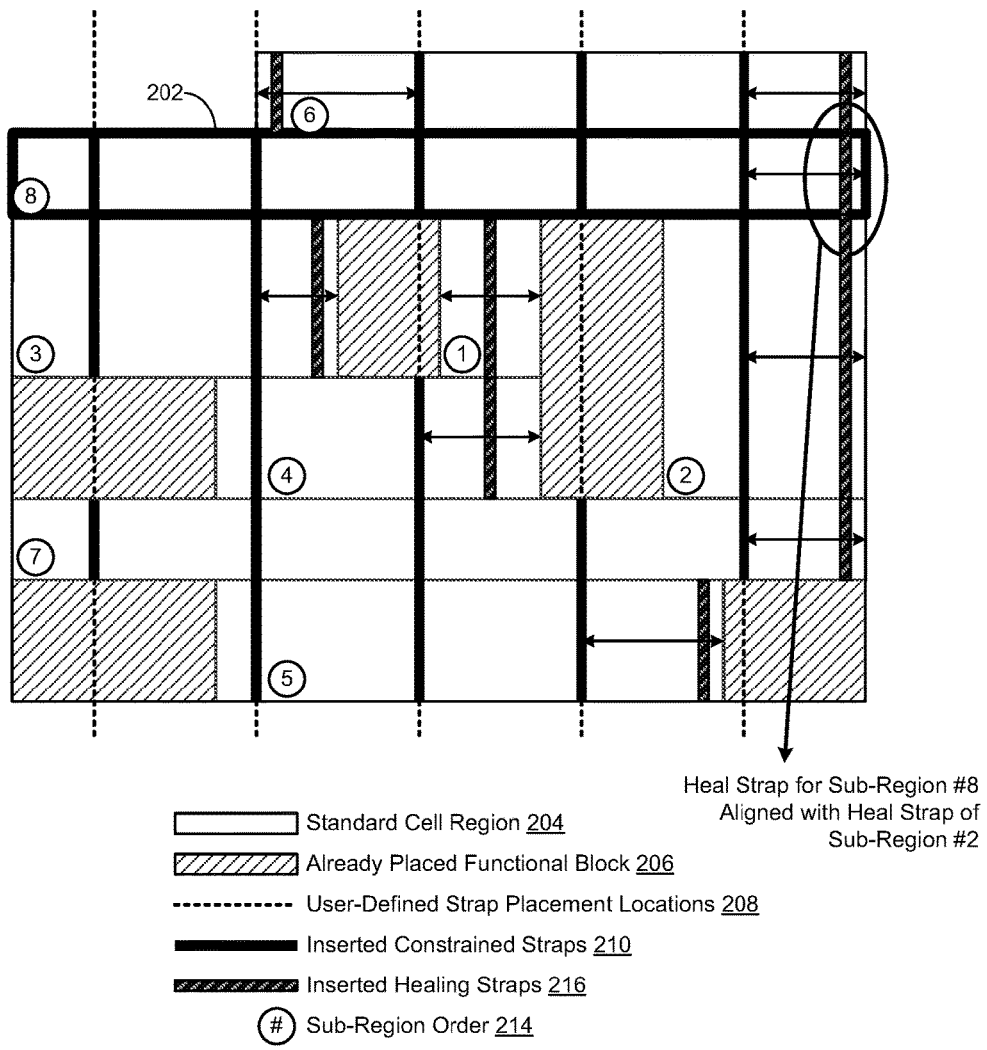
Figure 2N:
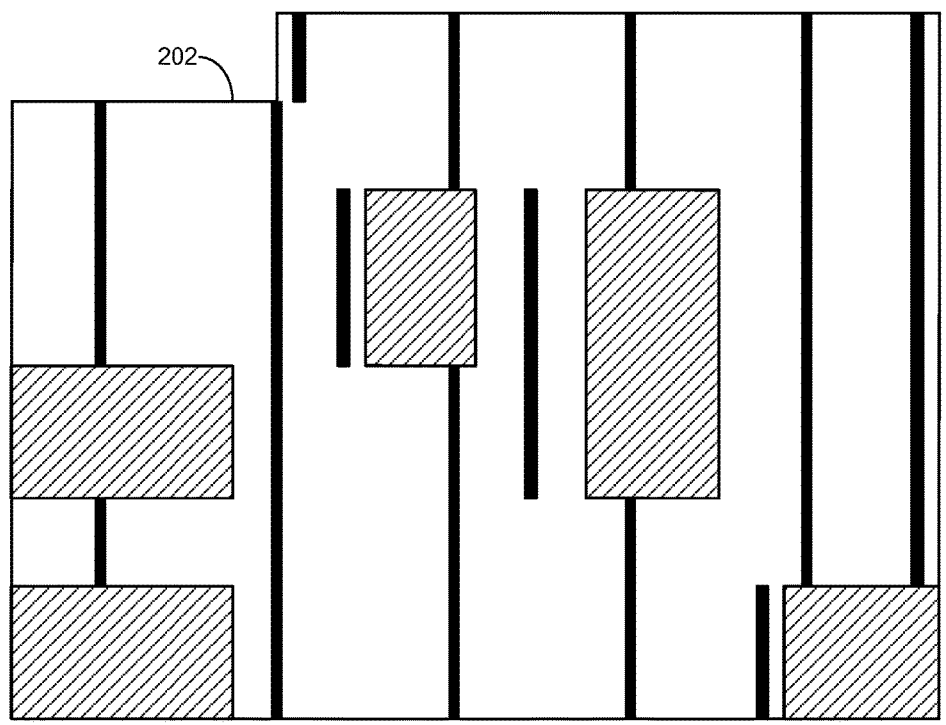

FIGS. 2A-2N illustrate diagrams of modifying power grid layout architecture in accordance with various implementations described herein.

In particular, FIG. 2A shows a diagram 200A of power grid layout architecture that may be embodied as a sample chip floorplan, such as, e.g., the floorplan 202 having standard cell region 204 and already placed functional blocks 206. While the functional blocks in this figure are rectangular, one or more of them could be rectilinear without affecting the the power grid healing schemes and techniques described herein. The power grid healing schemes and techniques described herein may receive the floorplan 202, which may be provided as a single power domain floorplan. However, the floorplan 202 may also include multiple power domains and may implement various power gating schemes. In various scenarios, the already placed functional blocks 206 may define various types of device macros that represent the components of the integrated circuit including, e.g., one or more of a core, a memory, a double data rate (DDR) unit, a power management unit, and other types of devices and/or components that may be useful in providing various features and functionality that may be associated with the integrated circuit.

The power grid healing schemes and techniques described herein may run on one power domain at a time, if there are multiple power domains in the design. As such, the following diagrams may only show a bounding box for a single power domain. Also, the power grid healing schemes and techniques described herein may be used for healing multiple types of objects (e.g., power switches, metal wires, and/or vias). For simplicity of discussion, the following diagrams show an instance of metal wire healing for a particular power supply. The user-defined power strap locations for other supplies are not present for the sake of clarity.

FIG. 2B shows another diagram 200B of the power grid layout architecture, wherein the floorplan 202 may include one or more user defined strap placement locations 208. The power grid healing schemes and techniques described herein may identify the user defined placement locations. The already placed functional blocks 206 may be hard macros, such as, e.g., memories, that may be placed anywhere in the floorplan 202. Sometimes, various instances may form a larger closely related function and may be placed such that there is a small area of standard cell rows between them (channels) to allow for the placement of inverters, buffers, flip flops, etc. close to the instances. The channels may not align with the user defined strap placement locations, and this may result in standard cell rows receiving no or inadequate power. As such, the power grid healing schemes and techniques described herein may find these channels and add one or more power straps to them for the missing supplies and/or power switches.

FIG. 2C shows another diagram 200C of the power grid layout architecture, wherein the floorplan 202 may include one or more inserted straps 210, which may be referred to as inserted (user defined) constraint straps. The power grid healing schemes and techniques described herein may define placement of inserted straps based on user defined parameters and/or constraints. The user defined spacing between straps may be used to locate and lock those locations prior to healing. In various implementations, the term strap may refer to a metal wire (or some other type of conductive strap) that may be used to build the power grid and various routes in the power grid. The term pitch may refer to a track (or a track location) associated with a unit of measure that is equal to (or substantially similar to) a minimum metal width and/or a minimum metal space. Further, in some cases, the term pitch may refer to a fundamental pitch that may be used for vertical and/or horizontal pitches.

FIG. 2D shows another diagram 200D of the power grid layout architecture, wherein the standard cell region 204 of the floorplan 202 may be sub-divided into multiple sub-regions 212. The power grid healing schemes and techniques described herein may sub-divide (or break down) the standard cell region 204 for each power domain into sub-regions 212, such as, e.g., rectangular sub-regions. In various scenarios, the standard cell region 204 may be broken down into horizontal sub-regions 212 for healing vertical power switches, straps, and/or vias. However, the standard cell region 204 may otherwise be broken down into vertical sub-regions for healing horizontal power switches, straps, and/or vias. As such, the standard cell area or region 204 may be divided into horizontal rectangular sub-regions 212 when healing vertically oriented structures, or when healing horizontally oriented structures, vertical rectangular sub-regions may be used. Since the floorplan and obstructions can both be rectilinear, subdividing the standard cell area into rectangles makes analyzing the area simpler and more systematic. Other techniques to analyze the area may include using a heuristic to determine channel locations or using complex logical geometric functions of the already placed straps relative obstructions or the design area boundary. These techniques are prone to error.

Further, as shown, the power grid healing schemes and techniques described herein may order the sub-regions 212 from smallest to largest, such as, e.g., from smallest in width (e.g., sub-region 212:1) to largest in width (e.g., sub-region 212:8). As such, the sub-regions 212 may be processed from the smallest width to the largest (or widest) width to heal the appropriate areas within each sub-region 212. Smaller width sub-regions 212 may more difficult to heal since they may have less internal space for the heal structures to be legally placed. The power grid healing schemes and techniques described herein may try to align similar heal structures across different sub-regions 212 and/or adjacent or neighboring sub-regions 212. Healing smaller sub-regions 212 first may allow for a more efficient means for healing, and aligning healed structures may further reduce routing blockage caused by the power grid.

FIG. 2E shows another diagram 200E of the power grid layout architecture, wherein the standard cell region 204 of the floorplan 202 may be sub-divided into an ordered sequence of the multiple sub-regions 212. The power grid healing schemes and techniques described herein may sub-divide (or break down) the standard cell region 204 for each power domain into sub-regions 212 from smallest to largest. In some scenarios, as shown in FIGS. 2D-2E, a sub-region order 214 may be used to define the order of the sub-regions 212 from smallest to largest. For instance, a smallest sub-region 212:1 may be identified and may start a smallest-to-largest sequence of the sub-region order 214 from 212:1 to 212:8 (i.e., 212:1, 212:2, 212:3, . . . , 212:8), wherein a largest sub-region 212:8 may end or finish the ordered sequence of the sub-region order 214.

FIG. 2F shows another diagram 200F of the power grid layout architecture, wherein a first sub-region #1 in the sub-region order 214 may be healed (or repaired) by inserting at least one healing strap. In this instance, the power grid healing schemes and techniques described herein may provide for healing the first sub-region #1 by inserting (or adding) at least one healing strap 216.

In some scenarios, the first sub-region #1 may include a heal location where a minimum number of straps per sub-region has not been met thus resulting in one or more healing strap(s) 216 being placed in the first sub-region #1 based on size of the sub-region and a minimum number of straps per sub-region as defined in the user defined parameters and/or constraints. As shown in FIG. 2F, one or more additional power straps may be inserted in the first sub-region #1 based on the user defined parameters, wherein insertion of one or more healing straps 216 may include adding one or more additional power straps in the first sub-region #1 such that the one or more additional power straps align with a central portion of the first sub-region #1. In some cases, if more than one power strap is to be inserted or added in a sub-region, then multiple additional power straps may be inserted or added to the sub-region so as to be as evenly spaced in the sub-region as possible while avoiding constraint straps. The healing shown in FIG. 2F may be referred to as a first type of healing.

FIG. 2G shows another diagram 200G of the power grid layout architecture, wherein a second sub-region #2 in the sub-region order 214 may be healed (or repaired) by inserting at least one healing strap. In this instance, the power grid healing schemes and techniques described herein may provide for healing the second sub-region #2 by inserting (or adding) at least one healing strap 216.

In some scenarios, the second sub-region #2 may include a heal location where a minimum number of straps per sub-region has been met and the distance from an end of the sub-region rectangle to the nearest power strap exceeded the maximum allowed spacing as defined in the inputs thus resulting in one or more healing strap(s) 216 being placed in the second sub-region #2 at an edge thereof at a minimum space away from the edge. As shown in FIG. 2G, one or more additional power straps may be inserted in the second sub-region #2 based on the user defined parameters, wherein insertion of one or more healing straps 216 may include adding one or more additional power straps in the second sub-region #2 such that the one or more additional power straps align with an edge (or edge portion) of the second sub-region #2. The healing shown in FIG. 2G may be referred to as a second type of healing.

FIG. 2H shows another diagram 200H of the power grid layout architecture, wherein a third sub-region #3 in the sub-region order 214 may be healed (or repaired) by inserting at least one healing strap. In this instance, the power grid healing schemes and techniques described herein may provide for healing the third sub-region #3 by inserting (or adding) at least one healing strap 216.

In some scenarios, the third sub-region #3 may include a heal location where a minimum number of straps per sub-region has been met and the distance from an end of the sub-region rectangle to the nearest power strap exceeded the maximum allowed spacing as defined in the inputs thus resulting in one or more healing strap(s) 216 being placed in the third sub-region #3 at an edge thereof at a minimum space away from the edge. Thus, as shown in FIG. 2H, one or more additional power straps may be inserted in the third sub-region #3 based on the user defined parameters, wherein insertion of one or more healing straps 216 may include adding one or more additional power straps in the third sub-region #3 such that the one or more additional power straps align with an edge (or edge portion) of the third sub-region #3. The healing shown in FIG. 2H may be referred to as the second type of healing.

FIG. 2I shows another diagram 200I of the power grid layout architecture, wherein a fourth sub-region #4 in the sub-region order 214 may be healed (or repaired) by inserting at least one healing strap. In this instance, the power grid healing schemes and techniques described herein may provide for healing the fourth sub-region #4 by inserting (or adding) at least one healing strap 216.

In some scenarios, the fourth sub-region #4 may include a heal location where a minimum number of straps per sub-region has been met and the distance from an end of the sub-region rectangle to the nearest power strap exceeded the maximum allowed spacing as defined in the inputs and there is a heal location in one of the sub-regions (e.g., the first sub-region #1) that is within the maximum spacing constraint thus resulting in one or more healing strap(s) 216 being placed in the fourth sub-region #4 so as to be aligned with the strap in the other sub-region (e.g., the first sub-region #1). As shown in FIG. 2I, one or more additional power straps may be inserted in the fourth sub-region #4 based on the user defined parameters, wherein insertion of one or more healing straps 216 may include adding one or more additional power straps in the fourth sub-region #4 such that the one or more additional power straps align with at least one previously inserted additional power strap in an adjacent sub-region or neighboring sub-region (e.g., the first sub-region #1). The healing shown in FIG. 2I may be referred to as a third type of healing.

Thus, in accordance with various implementations described herein, the power grid healing schemes and techniques may insert healing straps based on analysis to re-align a newly inserted strap with the user defined strapping placement. Further, previously healed sub-regions may influence another strapping placement in another sub-region, and thus, the power grid healing schemes and techniques described herein may align newly inserted straps with a previously placed strap. For some of these heals, the power grid healing schemes and techniques described herein may identify where healing straps should be placed and at what location by being aware of previously placed straps in near or surrounding sub-regions to thereby perform educated placement of new straps. Thus, healing straps may be aligned across multiple sub-regions.

FIG. 2J shows another diagram 200J of the power grid layout architecture, wherein a fifth sub-region #5 in the sub-region order 214 may be healed (or repaired) by inserting at least one healing strap. In this instance, the power grid healing schemes and techniques described herein may provide for healing the fifth sub-region #5 by inserting (or adding) at least one healing strap 216.

In some scenarios, the fifth sub-region #5 may include a heal location where a minimum number of straps per sub-region has been met and the distance from an end of the sub-region rectangle to the nearest power strap exceeded the maximum allowed spacing as defined in the inputs thus resulting in one or more healing strap(s) 216 being placed in the fifth sub-region #5 at an edge thereof at a minimum space away from the edge. Thus, as shown in FIG. 2J, one or more additional power straps may be inserted in the fifth sub-region #5 based on the user defined parameters, wherein insertion of one or more healing straps 216 may include adding one or more additional power straps in the fifth sub-region #5 such that the one or more additional power straps align with an edge (or edge portion) of the fifth sub-region #5. The healing shown in FIG. 2J may be referred to as the second type of healing.

FIG. 2K shows another diagram 200K of the power grid layout architecture, wherein a sixth sub-region #6 in the sub-region order 214 may be healed (or repaired) by inserting at least one healing strap. In this instance, the power grid healing schemes and techniques described herein may provide for healing the sixth sub-region #6 by inserting (or adding) at least one healing strap 216.

In some scenarios, the sixth sub-region #6 may include multiple heal locations where a minimum number of straps per sub-region has been met and the distance from an end of the sub-region rectangle to the nearest power strap exceeded the maximum allowed spacing as defined in the inputs thus resulting in multiple healing strap(s) 216 being placed in the sixth sub-region #6 at multiple edges thereof at a minimum space away from the edges. Thus, as shown in FIG. 2K, multiple additional power straps may be inserted in the sixth sub-region #6 based on the user defined parameters, wherein insertion of multiple healing straps 216 may include adding multiple additional power straps in the sixth sub-region #6 such that the multiple additional power straps align with multiple edges (or edge portions) of the sixth sub-region #6. The healing shown in FIG. 2K may be referred to as the second type of healing. In addition, in reference to the third type of healing, the healing strap 216 in the sixth sub-region #6 may align with at least one previously inserted additional power strap 216 in an adjacent sub-region or neighboring sub-region (e.g., the second sub-region #2).

FIG. 2L shows another diagram 200L of the power grid layout architecture, wherein a seventh sub-region #7 in the sub-region order 214 may be healed (or repaired) by inserting at least one healing strap. In this instance, the power grid healing schemes and techniques described herein may provide for healing the seventh sub-region #7 by inserting (or adding) at least one healing strap 216.

In some scenarios, the seventh sub-region #7 may include at least one heal location where a minimum number of straps per sub-region has been met and the distance from an end of the sub-region rectangle to the nearest power strap exceeded the maximum allowed spacing as defined in the inputs thus resulting in one or more healing strap(s) 216 being placed in the seventh sub-region #7 at an edge thereof at a minimum space away from the edge. As shown in FIG. 2L, one or more additional power straps may be inserted in the seventh sub-region #7 based on the user defined parameters, wherein insertion of one or more healing straps 216 may include adding one or more additional power straps in the seventh sub-region #7 such that the one or more additional power straps align with an edge (or edge portion) of the seventh sub-region #7. The healing shown in FIG. 2L may be referred to as the second type of healing. In reference to the third type of healing, the healing strap 216 in the seventh sub-region #7 may align with at least one previously inserted additional power strap 216 in an adjacent or neighboring sub-region (e.g., the second sub-region #2).

FIG. 2M shows another diagram 200M of the power grid layout architecture, wherein an eighth sub-region #8 in the sub-region order 214 may be healed (or repaired) by inserting at least one healing strap. In this instance, the power grid healing schemes and techniques described herein may provide for healing the eighth sub-region #8 by inserting (or adding) at least one healing strap 216.

In some scenarios, the eighth sub-region #8 may include at least one heal location where a minimum number of straps per sub-region has been met and the distance from an end of the sub-region rectangle to the nearest power strap exceeded the maximum allowed spacing as defined in the inputs thus resulting in one or more healing strap(s) 216 being placed in the eighth sub-region #8 at an edge thereof at a minimum space away from the edge. As shown in FIG. 2M, one or more additional power straps may be inserted in the eighth sub-region #8 based on the user defined parameters, wherein insertion of one or more healing straps 216 may include adding one or more additional power straps in the eighth sub-region #8 such that the one or more additional power straps align with an edge (or edge portion) of the eighth sub-region #8. The healing shown in FIG. 2M may be referred to as the second type of healing. In reference to the third type of healing, the healing strap 216 in the eighth sub-region #8 may align with at least one previously inserted additional power strap 216 in an adjacent sub-region or neighboring sub-region (e.g., the second sub-region #2).

FIG. 2N shows another diagram 200N of the power grid layout architecture, wherein the floorplan 202 may include the standard cell region 204, the already placed functional blocks 206, and the metal power straps 218 that are constrained and healed in a manner as described in reference to FIGS. 2A-2M. In this instance, the power grid healing schemes and techniques described herein may provide for healing the floorplan 202 by inserting (or adding) the user defined constrained straps and further inserting (or adding) healing straps so as to provide the metal power straps 218. In some scenarios, the floorplan 202 of FIG. 2N illustrates a physical result of implementing the power grid healing schemes and techniques described herein.

Thus, in accordance with various implementations described herein, the power grid healing schemes and techniques may select small to large sub-regions to thereby provide a more efficient mechanism to align straps. In some instances, efficiency may be achieved by inserting healing straps that align with existing sub-region straps or previously inserted straps. Further, a smaller sub-region may be processed first, because there may be fewer legal locations to place a healing strap or straps. Thus, the process may start with the smaller sub-region to thereby easily place a healing strap in a legal location, then it may be more efficient to align new healing straps in larger sub-regions to the already placed straps in smaller sub-regions. In some cases, alignment may be easier to implement in larger sub-regions.

In some implementations, the power straps may include at least one of metal wires, power switches (which may be referred to as power gates), and/or vias. In some other implementations, the metal wire on any particular layer may include two or more parallel wires on that same layer.

In accordance with various implementations described herein, the user defined parameters may be utilized to identify architectural features or structures having different power domains or multiple power domains or islands for fabrication with power straps and attachment to a power grid. The power grid layout architecture may refer to one or more of various mask levels that may be identified for the power grid due to a physical feature or attribute of that mask level. The physical feature or attribute may refer to an increased thickness in a metal for a particular mask that may result in an electrical attribute, such as, e.g., a lower resistance. Another physical feature or attribute may refer to greater line-to-line capacitance between a signal wire and a power wire, which may be associated with "good" capacitance. Another physical feature or attribute may refer to a decreased thickness in a metal that is defined by a mask that results in an electrical attribute, such as, e.g., a higher resistance. Another physical feature or attribute may be that a metal is thinner which may result in less line-to-line coupling, which may thus result in less line-to-line capacitance, if the mask is used for a signal wire and not a power wire. These physical features and/or attributes may be applied to power grid wiring and/or signal wiring.

Figure 3:
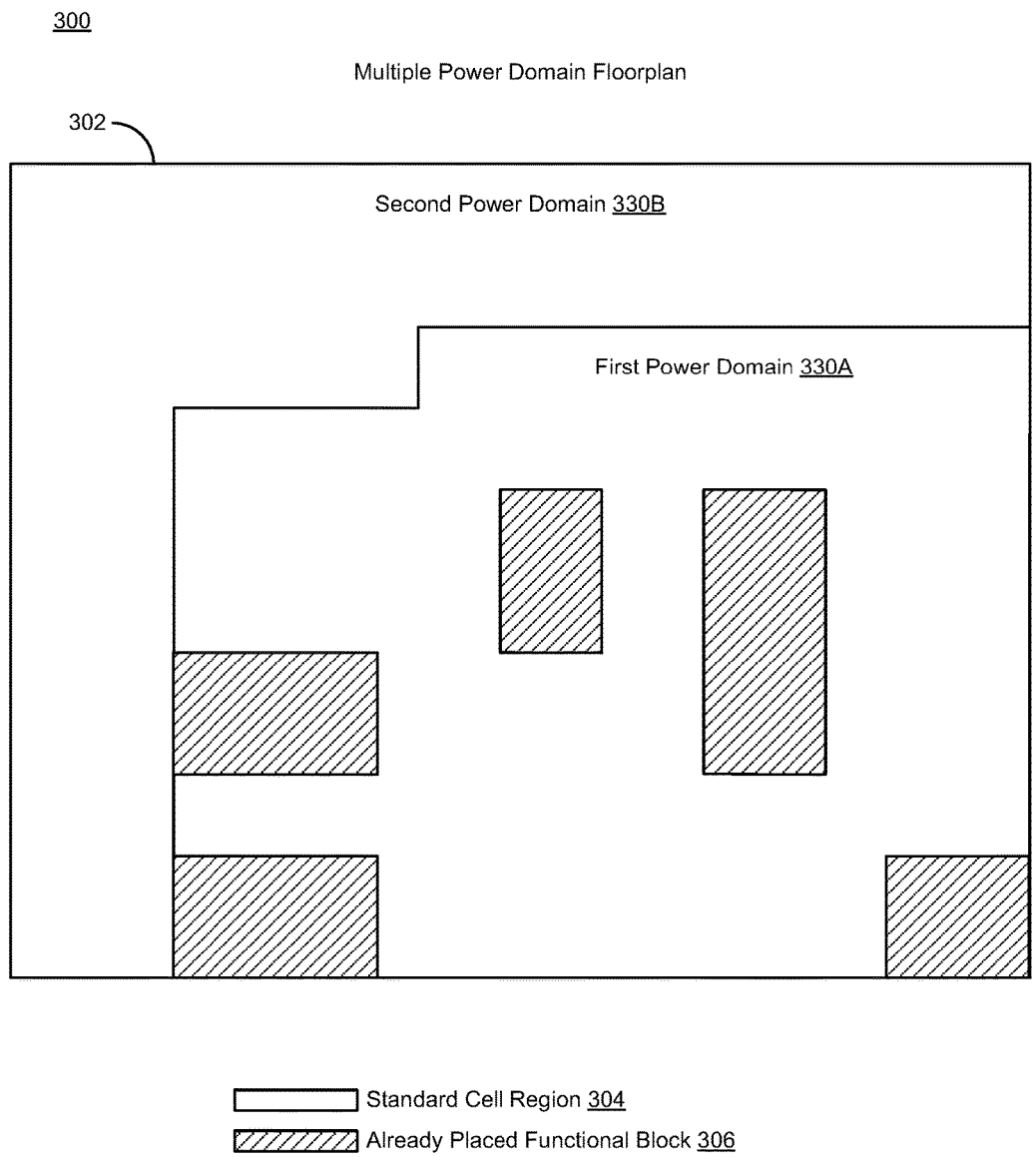
FIG. 3 illustrates a diagram of power grid layout architecture having multiple power domains in accordance with various implementations described herein.

FIG. 3 illustrates a diagram of power grid layout architecture having multiple power domains in accordance with various implementations described herein.

In particular, FIG. 3 shows a diagram 300 of power grid layout architecture that may be embodied as another sample chip floorplan 302 having standard cell regions 304 and already placed functional blocks 306. Thus, the power grid healing schemes and techniques described herein may receive the floorplan 302, which may be provided as a multiple power domain floorplan having a first power domain 330A and a second power domain 330B. In various scenarios, the already placed functional blocks 306 may define various types of device macros that represent the components of the integrated circuit including, e.g., one or more of a core, a memory, a DDR unit, a power management unit, and other types of devices and/or components that may be useful in providing various features and functionality that may be associated with the integrated circuit.

The power grid healing schemes and techniques described herein may run on and/or be performed on one or more power domains at a time, including, e.g., the one or more power domains 330A, 330B of the design. As shown in FIG. 3, a bounding box may be provided for each of the multiple power domains 330A, 330B. Also, the power grid healing schemes and techniques described herein may be used for healing multiple types of objects (e.g., power switches, power straps, and/or vias).

Figure 4:
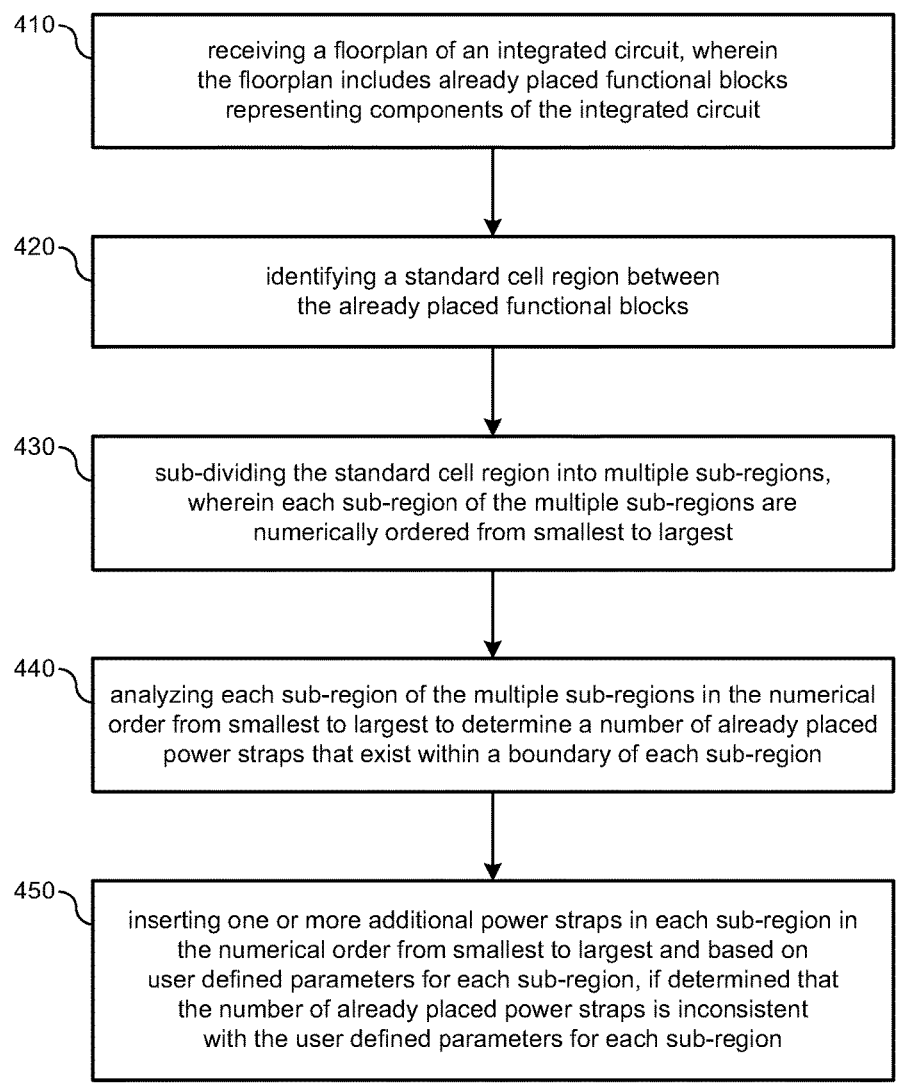
FIG. 4 illustrates a process flow diagram of a method for implementing power grid healing in accordance with various implementations described herein.

FIG. 4 illustrates a process flow diagram of a method 400 for implementing power grid healing in accordance with various implementations described herein.

It should be understood that even though method 400 may indicate a particular order of operation execution, in some cases, various certain portions of operations may be executed in a different order, and on different systems. In some other cases, additional operations and/or steps may be added to and/or omitted from method 400. Method 400 may be implemented in hardware and/or software. If implemented in hardware, method 400 may be implemented with various components, such as described herein above in reference to FIGS. 1-3. If implemented in software, method 400 may be implemented as a program or software instruction process that may be configured for implementing various power grid healing schemes and techniques as described herein. Further, if implemented in software, various instructions related to implementing method 400 may be stored in memory, wherein a computer, a server, or various other computing devices having a processor and memory may be configured to perform method 400.

In reference to FIG. 4, method 400 may be utilized for implementing various power grid healing schemes and techniques.

At block 410, method 400 may receive a floorplan of an integrated circuit. The floorplan may include already placed functional blocks representing components of the integrated circuit. The floorplan of the integrated circuit may be embodied as a schematic representation of physical placement of the already placed functional blocks within an outer peripheral boundary of the integrated circuit. The already placed functional blocks may define various macros representing the components of the integrated circuit including, e.g., one or more of a core, a memory, a double data rate (DDR) unit, and a power management unit. Further, the floorplan of the integrated circuit may be utilized for applying the integrated circuit to a semiconductor wafer.

In some scenarios, at block 410, method 400 may also receive the user defined parameters from a user via user input. The user defined parameters may identify various architectural features and/or structures having different power domains or multiple power domains or islands for fabrication with power straps and attachment to a power grid.

At block 420, method 400 may identify a standard cell region of the floorplan between the already placed functional blocks. The standard cell region may include open space of the floorplan between the already place functional blocks. As such, the standard cell may include unoccupied space between components of the integrated circuit.

At block 430, method 400 may sub-divide the standard cell region into multiple sub-regions, wherein each sub-region of the multiple sub-regions is numerically ordered from smallest to largest. In some instances, each sub-region of the multiple sub-regions is numerically ordered from smallest in width to largest in width. Each sub-region of the multiple sub-regions may be contoured as a geometrical shape. The geometrical shape may be rectangular. The geometrical shape may be a horizontally oriented rectangle or a vertically oriented rectangle.

At block 440, method 400 may analyze each sub-region of the multiple sub-regions in the numerical order from smallest to largest to determine a number of already placed power straps that exist within a boundary of each sub-region. In various scenarios, the already placed power straps and/or the additional power straps may be at least one of metal wires, power switches, power gates, and vias.

At block 450, method 400 may insert one or more additional power straps in each sub-region in the numerical order from smallest (width) to largest (width) and based on user defined parameters for each sub-region, e.g., if method 400 determines that the number of already placed power straps is inconsistent with the user defined parameters for each sub-region. In some scenarios, at block 450, method 400 may inhibit insertion of the one or more additional power strap in each sub-region in the numerical order from smallest (width) to largest (width) and, e.g., if method 400 determines that the number of already placed power straps is consistent with the user defined parameters for each sub-region. The smallest sub-region may refer to a sub-region having a smallest width, and the largest sub-region may refer to a sub-region having a largest width.

In some cases, at block 450, method 400 may insert the one or more additional power straps in each sub-region based on user defined parameters for each sub-region by adding the one or more additional power straps in each sub-region such that the one or more additional power straps align with at least one previously inserted additional power strap in an adjacent sub-region or neighboring sub-region. In other cases, at block 450, method 400 may insert the one or more additional power straps in each sub-region based on user defined parameters for each sub-region by adding the one or more additional power straps in each sub-region such that the one or more additional power straps align with a central portion of each sub-region. In some cases, if more than one power strap is to be inserted or added in a sub-region, then multiple additional power straps may be inserted or added to the sub-region so as to be as evenly spaced in the sub-region as possible while avoiding constraint straps. In some other cases, at block 450, method 400 may insert the one or more additional power straps in each sub-region based on user defined parameters for each sub-region by adding the one or more additional power straps in each sub-region such that the one or more additional power straps align with an edge portion of each sub-region.

Figure 5:
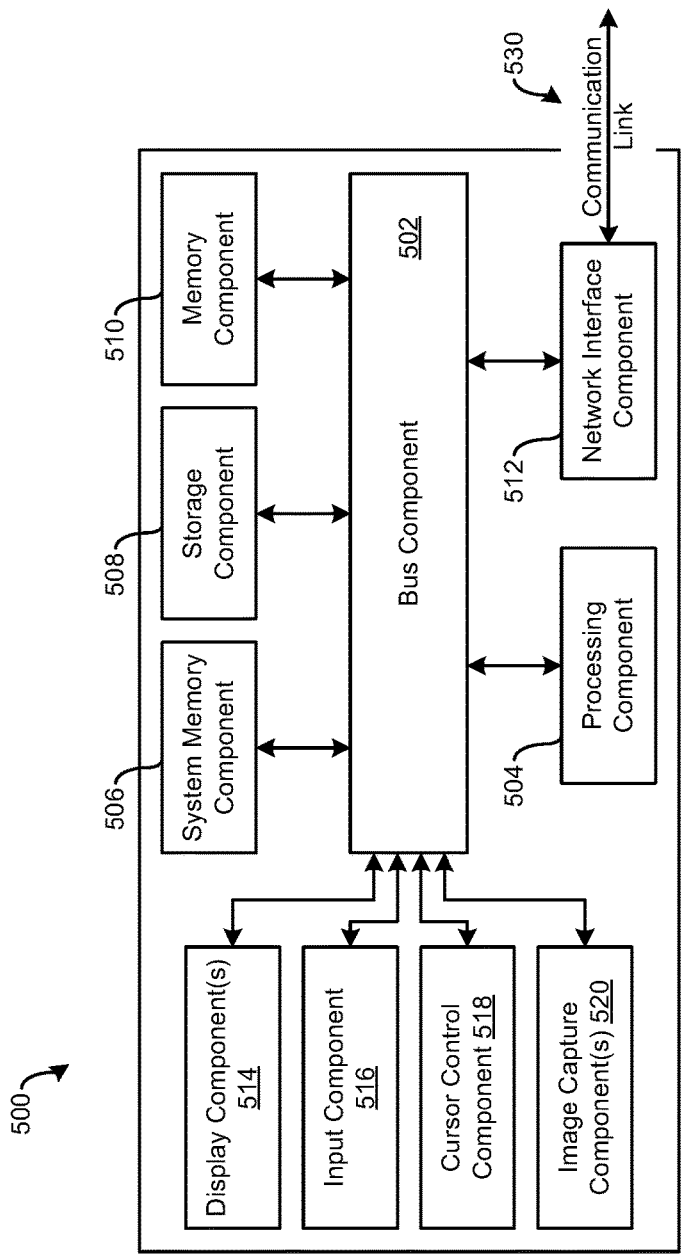
FIG. 5 illustrates a block diagram of a computing device in accordance with various implementations described herein.

FIG. 5 is a block diagram of a computing device 500 suitable for implementing various implementations described herein, including, e.g., the computing device 102 and components associated therewith in FIG. 1. As such, the computing device 500 may be embodied as the computing device 102 and be configured for network communication with various other computing devices over a wired or wireless network.

The computer device 500 may be implemented as various types of computing devices, such as, e.g., a server, a personal computer (PC), a laptop, a notebook, a mobile communication device, or similar. The computer device 500 may include a bus 502 (or other communication mechanism for communicating information) that interconnects the various subsystems and/or components, such as, e.g., processing component 504 (e.g., processor, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., CRT or LCD), input component 516 (e.g., keyboard), cursor control component 518 (e.g., mouse or trackball), and image capture component 520 (e.g., analog or digital camera). In some implementations, disk drive component 510 may comprise a database having one or more disk drive components.

The computer device 500 performs various specific operations by processor 504 executing one or more sequences of one or more instructions contained in system memory component 506. Such instructions may be read into system memory component 506 from another computer readable medium, such as static storage component 508 or disk drive component 510. In some cases, hard-wired circuitry may be used in place of or in combination with software instructions to implement the various schemes and/or techniques described herein.

Logic may be encoded in a computer readable medium, which may refer to any medium that participates in providing instructions to processor 504 for execution. Such a medium may take many forms, including but not limited to, non-volatile media and volatile media. In various implementations, non-volatile media includes optical or magnetic disks, such as disk drive component 510, and volatile media includes dynamic memory, such as system memory component 506. In some implementations, data and information related to execution instructions may be transmitted to computer device 500 via a transmission media, such as in the form of acoustic or light waves, including those generated during radio wave and infrared data communications. In various implementations, transmission media may include coaxial cables, copper wire, and/or fiber optics, including wires that comprise bus 502.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various implementations, execution of instruction sequences to practice the schemes and techniques described herein may be performed by computer device 500. In other implementations described herein, a plurality of computer systems 500 coupled by communication link 530 (e.g., LAN, WLAN, PTSN, and/or various other wired or wireless networks, including telecommunications, mobile, and/or cellular phone networks) may perform instruction sequences to practice implementations of the present disclosure in coordination with one another.

In various implementations, the computer device 500 may transmit and receive messages, data, information and instructions, including programs (i.e., application code) through communication link 530 and communication interface 512. Further, the received program code may be executed by the processor 504 as received and/or stored in disk drive component 510 or some other non-volatile storage component for execution.

Described herein are implementations of an apparatus. The apparatus may include a region identifier module that receives a floorplan of an integrated circuit, identifies a standard cell region between already placed functional blocks of the floorplan, and sub-divides the standard cell region into multiple sub-regions. The apparatus may include a region analyzer module that analyzes each sub-region of the multiple sub-regions to determine a number of already placed power straps that exist within a boundary of each sub-region. The apparatus may include a strap placement module that inserts one or more additional power straps in each sub-region based on user defined parameters for each sub-region, if it is determined that the number of already placed power straps is inconsistent with the user defined parameters for each sub-region.

Described herein are implementations of a method. The method may include receiving a floorplan of an integrated circuit, wherein the floorplan may include already placed functional blocks representing components of the integrated circuit. The method may include identifying a standard cell region between the already placed functional blocks. The method may include sub-dividing the standard cell region into multiple sub-regions, wherein each sub-region of the multiple sub-regions is numerically ordered from smallest to largest. The method may include analyzing each sub-region of the multiple sub-regions in the numerical order from smallest to largest to determine a number of already placed power straps that exist within a boundary of each sub-region. The method may include inserting one or more additional power straps in each sub-region in the numerical order from smallest to largest and based on user defined parameters for each sub-region, if it is determined that the number of already placed power straps is inconsistent with the user defined parameters for each sub-region.

Described herein are implementations of a non-transitory computer-readable medium having stored thereon a plurality of computer-executable instructions that, when executed by a computer, cause the computer to receive a floorplan of an integrated circuit, wherein the floorplan includes already placed functional blocks representing components of the integrated circuit. The instructions may cause the computer to identify a standard cell region between the already placed functional blocks. The instructions may cause the computer to sub-divide the standard cell region into multiple sub-regions. The instructions may cause the computer to analyze each sub-region of the multiple sub-regions to determine a number of already placed power straps that exist within a boundary of each sub-region. The instructions may cause the computer to insert one or more additional power straps in each sub-region based on user defined parameters for each sub-region, if it is determined that the number of already placed power straps is inconsistent with the user defined parameters for each sub-region.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
 a region identifier module that receives a floorplan of an integrated circuit, identifies a standard cell region between already placed functional blocks of the floorplan, and sub-divides the standard cell region into multiple sub-regions;
 a region analyzer module that analyzes each sub-region of the multiple sub-regions to determine a number of already placed power straps that exist within a boundary of each sub-region; and
 a strap placement module that inserts one or more additional power straps in each sub-region based on user defined parameters for each sub-region, if it is determined that the number of already placed power straps is inconsistent with the user defined parameters for each sub-region.

2. The apparatus of claim 1, wherein the region identifier module receives the user defined parameters from a user via user input.

3. The apparatus of claim 1, wherein the user defined parameters identify architectural features or structures having different power domains or multiple power domains or islands for fabrication with power straps and attachment to a power grid.

4. The apparatus of claim 1, wherein the strap placement module inhibits insertion of the one or more additional power straps in each sub-region, if it is determined that the number of already placed power straps is consistent with the user defined parameters for each sub-region.

5. The apparatus of claim 1, wherein the floorplan includes the already placed functional blocks that represent components of the integrated circuit.

6. The apparatus of claim 1, wherein the floorplan of the integrated circuit is a schematic representation of physical placement of the already placed functional blocks within an outer peripheral boundary of the integrated circuit.

7. The apparatus of claim 1, wherein the already placed functional blocks define macros representing the components of the integrated circuit having one or more of a microprocessor, a memory, a computer bus, a power management unit, a graphics processor, a digital signal processor, a timing source, an external interface, an analog-to-digital converter, a digital-to-analog converter, and a voltage regulator.

8. The apparatus of claim 1, wherein the floorplan of the integrated circuit is utilized for applying the integrated circuit to a semiconductor wafer.

9. The apparatus of claim 1, wherein each sub-region of the multiple sub-regions is numerically ordered from smallest in width to largest in width.

10. The apparatus of claim 9, wherein the analyzing each sub-region and the inserting of the one or more additional power straps in each sub-region is conducted in the numerical order of the sub-regions from smallest in width to largest in width.

11. The apparatus of claim 1, wherein each sub-region of the multiple sub-regions has a geometrical shape.

12. The apparatus of claim 11, wherein the geometrical shape is rectangular.

13. The apparatus of claim 11, wherein the geometrical shape is a horizontally oriented rectangle or a vertically oriented rectangle.

14. The apparatus of claim 1, wherein the already placed power straps and the additional power straps comprise at least one of metal wires, power switches, power gates, and vias.

15. The apparatus of claim 1, wherein the inserting the one or more additional power straps in each sub-region based on the user defined parameters for each sub-region comprises adding the one or more additional power straps in each sub-region such that the one or more additional power straps are aligned with at least one previously inserted additional power strap in an adjacent sub-region or neighboring sub-region.

16. The apparatus of claim 1, wherein the inserting the one or more additional power straps in each sub-region based on the user defined parameters for each sub-region comprises adding the one or more additional power straps in each sub-region such that the one or more additional power straps align with a central portion of each sub-region or are evenly spaced in the sub-region while avoiding already placed straps.

17. The apparatus of claim 1, wherein the inserting the one or more additional power straps in each sub-region based on the user defined parameters for each sub-region comprises adding the one or more additional power straps in each sub-region such that the one or more additional power straps align with an edge portion of each sub-region.

18. A method, comprising:
receiving a floorplan of an integrated circuit, wherein the floorplan includes already placed functional blocks representing components of the integrated circuit;
identifying a standard cell region between the already placed functional blocks;
sub-dividing the standard cell region into multiple sub-regions, wherein each sub-region of the multiple sub-regions is numerically ordered from smallest to largest;
analyzing each sub-region of the multiple sub-regions in the numerical order from smallest to largest to determine a number of already placed power straps that exist within a boundary of each sub-region; and
inserting one or more additional power straps in each sub-region in the numerical order from smallest to largest and based on user defined parameters for each sub-region, if it is determined that the number of already placed power straps is inconsistent with the user defined parameters for each sub-region.

19. The method of claim 18, wherein inserting one or more additional power straps in each sub-region based on user defined parameters for each sub-region comprises adding the one or more additional power straps in each sub-region such that:
the one or more additional power straps align with at least one previously inserted additional power strap in an adjacent sub-region or neighboring sub-region,
the one or more additional power straps align with a central portion of each sub-region or are evenly spaced in the sub-region while avoiding already placed straps, or
the one or more additional power straps align with an edge portion of each sub-region.

20. A non-transitory computer-readable medium having stored thereon a plurality of computer-executable instructions that, when executed by a computing device, cause the computing device to:
receive a floorplan of an integrated circuit, wherein the floorplan includes already placed functional blocks representing components of the integrated circuit;
identify a standard cell region between the already placed functional blocks;
sub-divide the standard cell region into multiple sub-regions;
analyze each sub-region of the multiple sub-regions to determine a number of already placed power straps that exist within a boundary of each sub-region; and
insert one or more additional power straps in each sub-region based on user defined parameters for each sub-region, if it is determined that the number of already placed power straps is inconsistent with the user defined parameters for each sub-region.

* * * * *